United States Patent [19]
Kakutani

[11] Patent Number: 6,061,845
[45] Date of Patent: May 16, 2000

[54] PORTABLE STOOL MADE OF PLASTICS

[75] Inventor: Masaji Kakutani, Kainan, Japan

[73] Assignee: MAC Sanko Co., Ltd., Wakayama, Japan

[21] Appl. No.: 09/144,191

[22] Filed: Aug. 31, 1998

[30] Foreign Application Priority Data

Dec. 27, 1997 [JP] Japan .................................. 9-369354

[51] Int. Cl.$^7$ .................................................. A47K 11/02
[52] U.S. Cl. .................................................. 4/460; 4/483
[58] Field of Search ............................... 4/449, 460, 483, 4/484

[56] References Cited

U.S. PATENT DOCUMENTS

| | | | |
|---|---|---|---|
| 1,026,413 | 5/1912 | Sullivan | 4/460 |
| 3,484,875 | 12/1969 | Eisenberg | 4/484 |
| 3,600,719 | 8/1971 | Karr | 4/484 X |
| 5,187,819 | 2/1993 | Grimes | 4/484 X |

FOREIGN PATENT DOCUMENTS 528453   10/1940   United Kingdom ...................... 4/460

*Primary Examiner*—Charles E. Phillips
*Attorney, Agent, or Firm*—Jordan & Hamburg LLP

[57] ABSTRACT

A portable stool has an enclosing wall assembly 'A' and a flat seat 'B' both made of the same or different plastics. The enclosing wall assembly is rectangular in plan view in its extended state and consists of a pair of right and left side walls (1a,1b) and a pair of front and rear transverse walls (2a,2b). Either the pair of side walls or the pair of transverse walls respectively consist of vertical halves hinged by mediate joints (4) to each other. Each side wall having a front and rear vertical edges is foldably connected by corner joints (5) to the transverse walls at lateral and vertical edges thereof adjacent to the former vertical edges. A back side of the flat seat 'B' has at least one members (7) capable of fitting on or in at least one other members (6) formed on an upper end of the enclosing wall assembly 'A', such that the instantly openable and closable stool can withstand the body weight of any user including children, allowing the children to use the stool safely and many times.

7 Claims, 4 Drawing Sheets

6,061,845

PORTABLE STOOL MADE OF PLASTICS

BACKGROUND OF THE INVENTION

1. Field of the Invention

The present invention relates to a portable stool or toilet bowl that may be made by molding a plastics, may collapse to become so compact when those who go driving or camping carry same, and can readily be extended again for use by them.

2. Prior Art

Some types of portable stools made of cardboards are known, and they may be collapsed compact when carried by users. Those collapsed stools will be extended to stand as box-shaped frames each for receiving a water-proof bag made of a soft plastics film or the like. A pack of water-absorbing powdery sol placed in the bag will become a block of gel after having absorbed user's urine or the like, thus facilitating the bag to be sealed and discarded.

Those prior art portable stools made of corrugated cardboards are very light in weight and convenient to carry. Those collapsed stools, they can be extended readily within one or two minutes to take a box-like shape, but in somewhat cumbersome manner. However, such stools made of cardboards are not necessarily satisfactory in their mechanical strength in extended state, tending to deform themselves or to crumble when users sit on them. Thus, users have not been able to rest their weight on those portable stools and felt much inconvenience. This problem may be more serious for children who use those stools more often.

SUMMARY OF THE INVENTION

An object of the present invention made in view of the drawbacks in the prior art portable stools is therefore to provide a novel one whose side walls are strong enough to withstand individual body weight of average children. Another object is to provide a portable stool that can instantly be extended into a stable posture ready for use. Still another object is to provide a portable stool that bears any user's, particularly any child's body weight, without undergoing deformation or crumbling, so that children can comfortably repeat to use the stool.

To achieve these objects, a stool or toilet bowl provided herein comprises an enclosing wall assembly and a generally flat seat both made of the same or different plastics. The enclosing wall assembly rectangular in plan view in its opened state consists of a pair of right and left side walls facing one another and a pair of front and rear transverse walls also facing one another. Either the pair of side walls or the pair of transverse walls respectively consist of vertical halves hinged by mediate joints to each other. Each side wall having a front and rear vertical edges is foldably connected by corner joints to the transverse walls at lateral and vertical edges thereof adjacent to the former vertical edges. A back side of the flat seat has at least one members or portions capable of fitting on or in at least one other members or portions that are formed on an upper end of the enclosing wall assembly or are top edges per se thereof.

In one mode of the invention, each of the transverse walls may consist of the vertical halves disposed side by side and connected by the mediate joints. The at least one members disposed on the back side of the seat may be lateral recesses fittable on the top edges of side walls, wherein these top edges serve as the at least one other members referred to above. The vertical halves of each transverse wall may be such that they assume a rectilinear configuration when extended and their outer faces contact one another when folded. Each transverse wall as a whole may lie perpendicular to the side walls at about an angle of 90 degrees when extended, and each half of the transverse wall may have its inner face contacting an inner face of one of the side walls when folded.

In another mode of the invention, each of the side walls may consist of vertical halves, which need not necessarily be folded inwards but possibly outwards so as to reduce thickness of the stool folded down. An opening formed in and through the seat may not necessarily be of a horseshoe-like shape but may be of a U-shape, a round or an oval shape in plan view.

As exemplified in the mode summarized above, it is desirable that the seat has protuberances or recesses and engageable with recesses or protuberances formed in or on the enclosing wall assembly such that said seat can be fixed on said assembly merely by placing the former on the latter. Preferably, the seat may have the recesses lest any protuberances such as lugs should render too voluminous the seat disassembled from the wall assembly. It also is desirable that the protuberances are not finger-like or wart-like lugs but the upper whole edges per se of side walls or transverse walls. Alternatively, right-hand and left-hand portions of the front wall and the upper whole edge of the rear wall may serve as the protuberances, or the upper whole edges of all of the four walls may do so. In these preferable cases, there is involved no protrusion or protuberance that would hinder the stool from being smoothly assembled, readily repackaged or easily cleaned, or would spoil appearance of the stool.

BRIEF DESCRIPTION OF THE DRAWINGS

In the drawings showing a stool provided in the most preferable embodiment of the invention.

THE PREFERRED EMBODIMENTS

Figure 2:
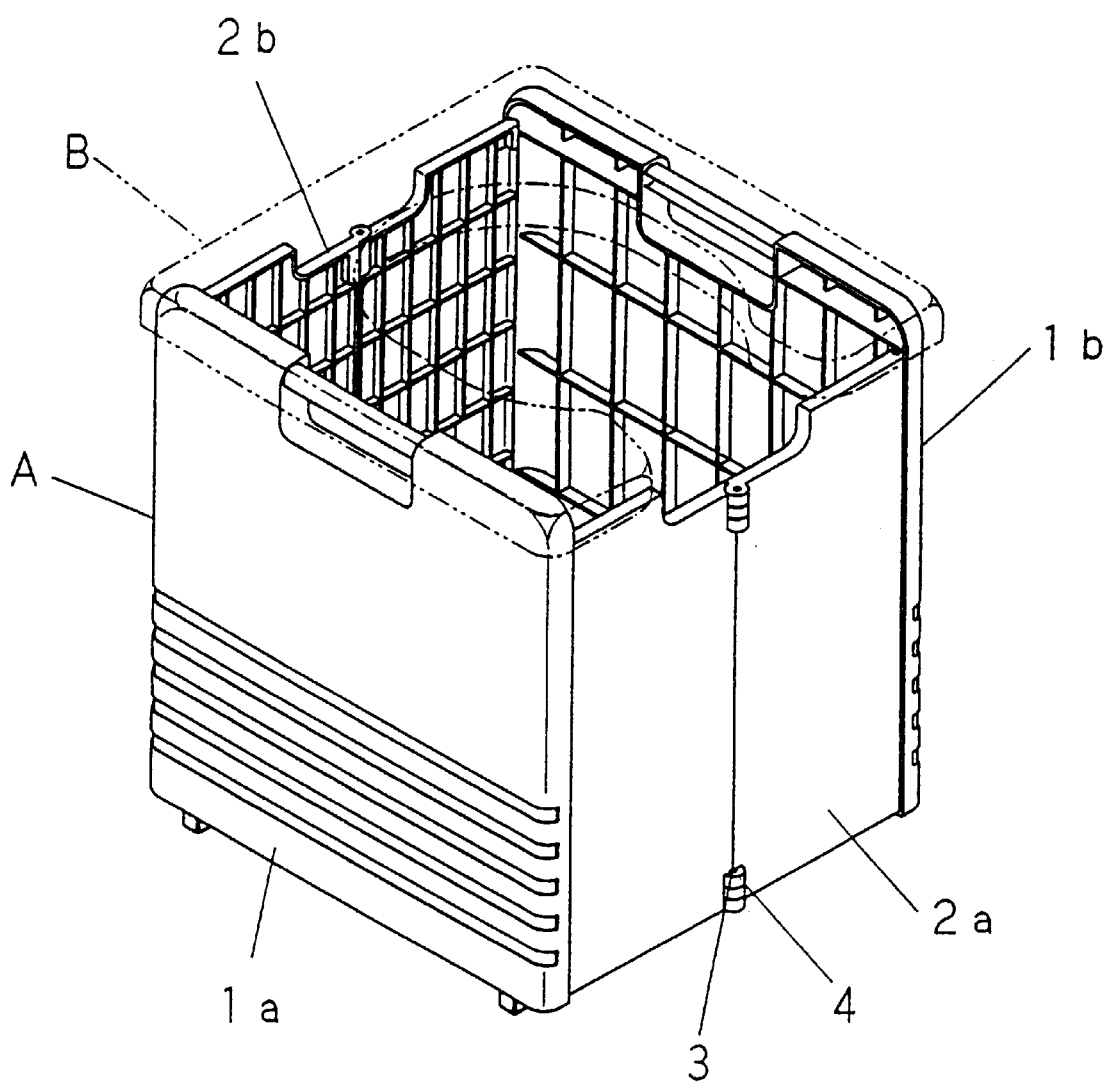
FIG. 2 is also a perspective view of the wall assembly and the seat shown with phantom lines and temporarily secured on said assembly.
Figure 3:
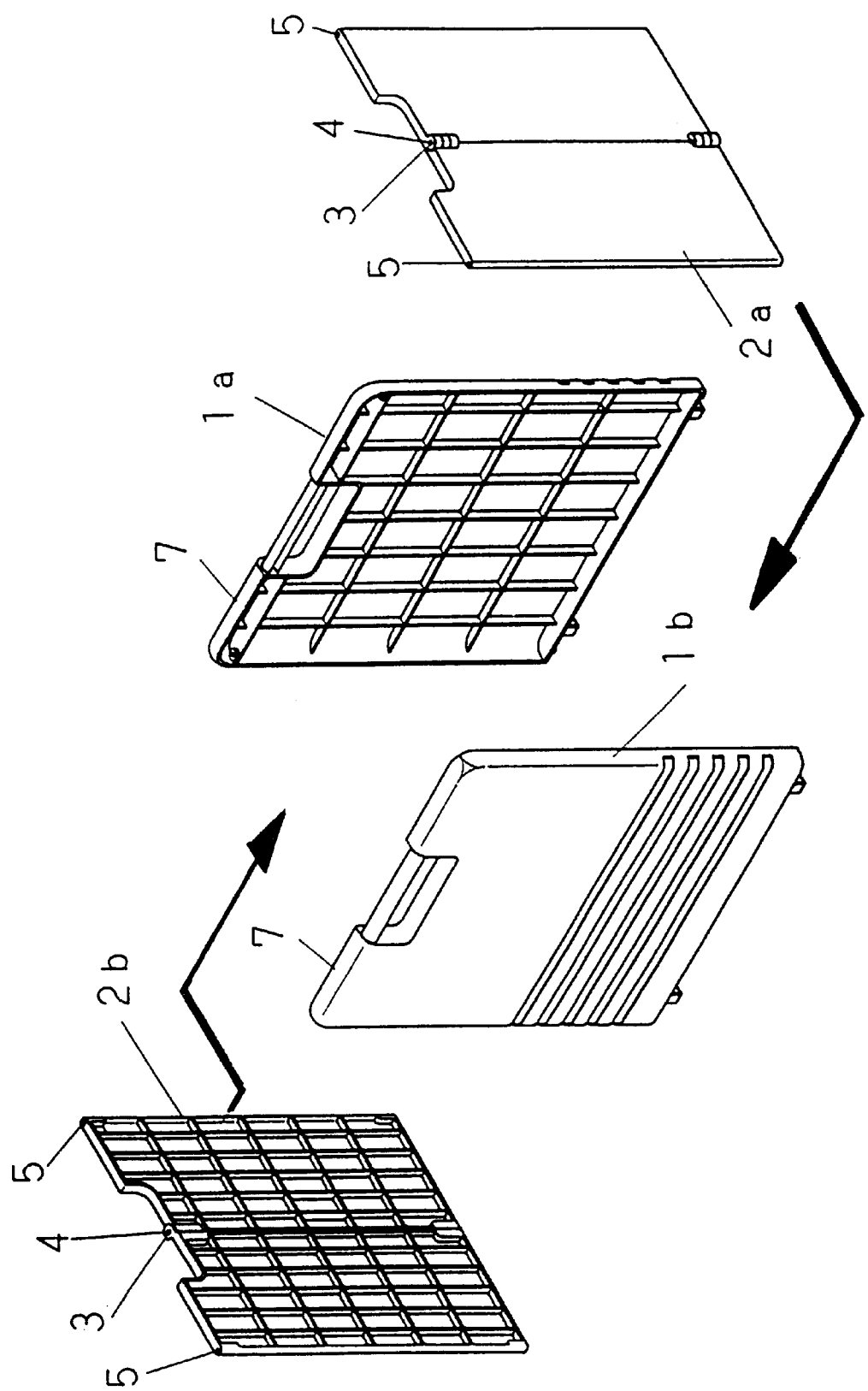
FIG. 3 perspective and exploded view of unit walls constituting the enclosing wall assembly.

As seen in FIG. 2 showing a stool constructed according to the most preferable embodiment, the stool consists of an enclosing wall assembly 'A' and a seat 'B' to be placed thereon. Four unit walls constituting the wall assembly 'A' rectangular in plan view in its extended state are a pair of right and left side walls 1a and 1b and a pair of front and rear transverse walls 2a and 2b. Those walls are formed by the injection molding of a plastics such as a polyvinyl chloride (PVC), a polyolefin resin for example a polypropylene (PP) or a polyethylene (PE). Each of the transverse walls 2a and 2b consists of vertical halves hinged to each other by mediate pins 4. Each pin is inserted in a pair of mating small cylindrical bearings 3 formed integral with said halves of the wall. In this embodiment, those halves of each of front and rear walls 2a and 2b are capable of swinging only between their rectilinear position in plan view in which they are included in a single common plane and their folded position in which their outer faces contact one another. Each of the side walls 1a and 1b is an integral flat plate. Corner pins 5 connect lateral edges of each transverse wall 2a and 2b rotatably to front vertical edges of the side walls 1a and 1b, or to rear vertical edges thereof, in a hingelike manner. Thus, the enclosing wall assembly can take either an open position in which the four unit walls 1a, 1b, 2a and 2b are disposed to assume a rectangular form or a closed position in which their inner faces contact one another.

The seat 'B' is formed of the same plastics as the wall assembly 'A' and has a horseshoe-shaped or Ω-shaped central opening. Longitudinal recesses 7 are formed in a back side of the seat 'B' and along lateral edges thereof. Top edges of the side walls 1a and 1b serve as members fitting in those longitudinal recesses 7.

Figure 4:
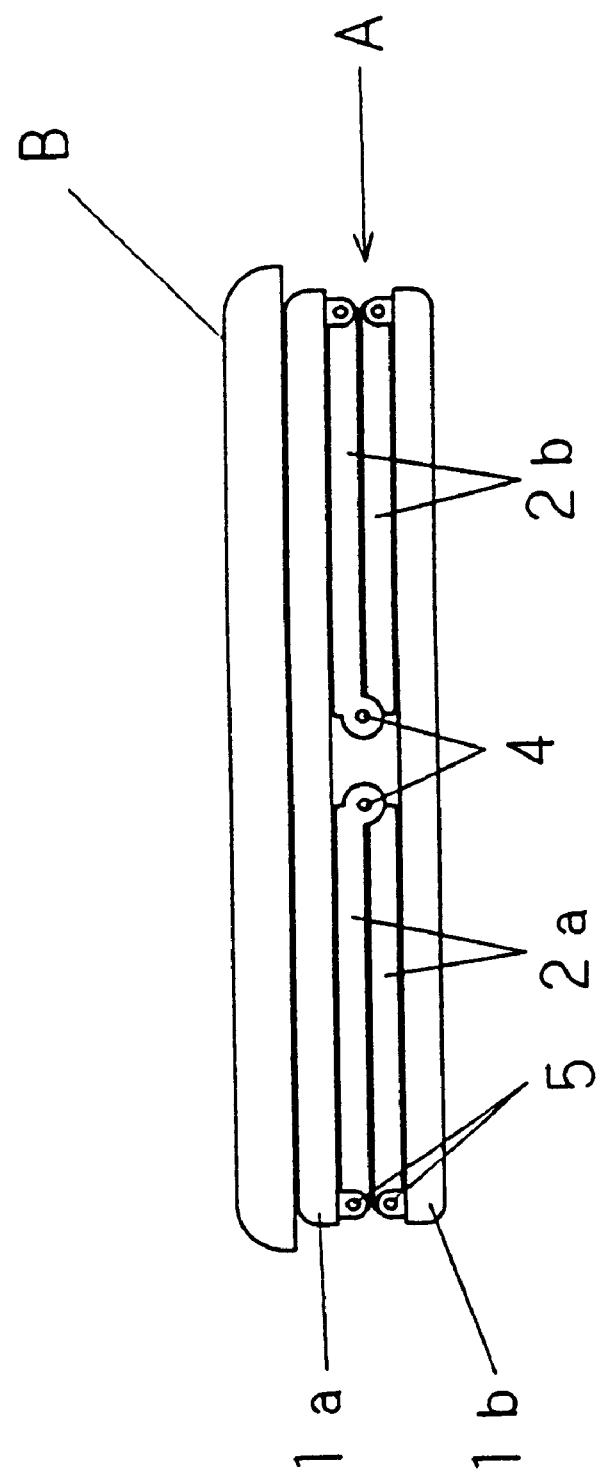
FIG. 4 is a plan view of the stool shown in its collapsed state.

Unless necessary to use the stool, it will be collapsed in a manner shown in FIG. 4. Each of its front and rear walls 2a and 2b will be folded double to be sandwiched by and between the side walls 1a and 1b of the wall assembly 'A' that are thus brought close to each other. The seat 'B' will be put on and along one of the side walls so that this stool can be packed in a bag.

Figure 1:
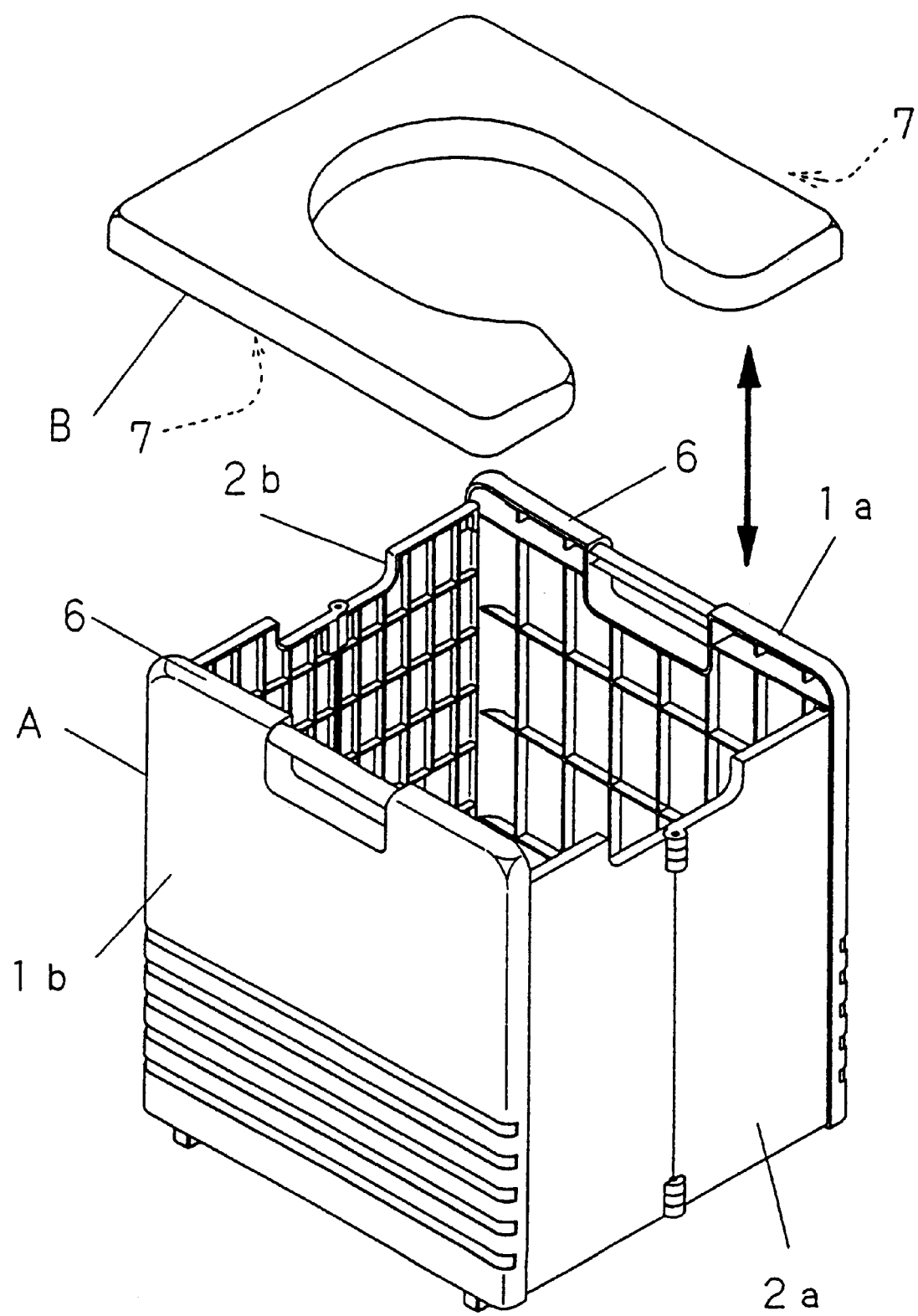
FIG. 1 is a perspective view of an enclosing wall assembly and a seat, shown in their disassembled state.

If anyone wants to use the stool, he or she may pull the side walls 1a and 1b sideways away from each other into a rectangular open state of the wall assembly 'A' as shown in FIG. 1. The peripheral margin around the mouth of a sack made for example of a thin plastics film will then be put over the upper periphery of the wall assembly thus instantly opened, with the sack's body portion being placed therein. A porous pack of water-absorbing sol may be put in the plastics film sack, if so desired, before setting the seat 'B' on the wall assembly.

After use, the side walls 1a and 1b will be pushed inward and towards each other so as to instantly collapse the wall assembly 'A' as shown in FIG. 4. The plastics film sack having received an amount of human evacuation or urinary will be sealed by closely tying its neck near the mouth. Thus, the used sack can now be discarded without fear of staining the user's hands and also without soiling the stool itself.

This embodiment may be modified in any manner within the scope of the present invention, and some modifications have already been discussed above.

In summary, the portable stool comprises the wall assembly of the side and transverse unit walls and the seat combined with said assembly, all the members being made of a plastics. Either the transverse walls or the side walls consist each of vertical halves hinged together, such that either the latter or the former remain each as an integral board. All the corner edges of the adjacent unit walls are respectively hinged to each other. When using the stool, its integral side walls or transverse walls may be pulled away from each other to instantly open the assembly into a rectangular open position. After use, said integral walls may be forced towards each other to thereby close the wall assembly also easily and quickly. Since the lower face of the seat has portions or members engageable with the upper edges of the wall assembly, the seat can be connected to the latter instantly by merely placing the former on the latter for the purpose of urgent use. After use, the seat will simply be removed from the wall assembly.

Since all the unit walls are formed of a plastics, the enclosing wall assembly can withstand the body weight of any user including children, they can use the portable stool safely and many times without fear of deforming or crumbling it.

What I claim is:

1. A portable plastics stool, comprising:
   an enclosing wall assembly made of plastic;
   a flat seat made of plastic and having an opening therethrough for use as a toilet;
   the enclosing wall assembly having a rectangular configuration in plan view in an extended state and being collapsible to a folded state, the enclosing wall assembly including:
   a pair of right and left side walls facing one another;
   a pair of transverse walls each consisting of vertical halves hinged by mediate joints to each other in such manner that said vertical halves are capable of swinging only between a position assumed when said enclosing wall assembly is in said extended state presenting said rectilinear configuration and a position thereof when in said folded state;
   each of said side walls having a front and rear vertical edges hinged by corner joints to the transverse walls at lateral and vertical edges thereof adjacent to said vertical edges of the side wall; and
   wherein a back side of the seat has at least one member capable of fittably engaging at least one other member formed on an upper end of each of said side walls of the enclosing wall assembly, such that when said enclosing wall assembly is opened to the extended state from the folded state and fittably engaged with said seat, said extended state of said enclosing wall assembly is achieved during set-up and maintained during active use without use of any supplemental base support structure.

2. A portable plastics stool as defined in claim 1, wherein the at least one members disposed on the back side of the seat includes structure defining recesses fittable on top edges of said side walls, with the top edges serving as the at least one other members.

3. A portable plastics stool as defined in claim 1 or 2, wherein:
   the vertical halves of each of the transverse walls assume a rectilinear configuration when extended and outer faces of said vertical halves of each of the transverse walls contact one another when folded; and
   each of said transverse walls as a whole lies perpendicular to the side walls when extended, and each of said vertical halves of the transverse walls has an inner face contacting an inner face of one of the side walls when folded.

4. A portable plastics stool comprising:
   an enclosing wall assembly made of plastic;
   a flat seat made of plastic and having an opening therethrough for use as a toilet;
   the enclosing wall assembly a rectangular configuration in plan view in an extended state and being collapsible to a folded state, the enclosing wall assembly including:
   a pair of right and left side walls facing one another; and
   a pair of front and rear transverse walls also facing one another;
   each of said side walls consisting of vertical halves hinged by mediate joints to each other in such manner that said vertical halves are capable of swinging only between a position assumed when said enclosing wall assembly is in said extended state presenting said rectilinear configuration and a position thereof when in said folded state; and
   each of said side walls having front and rear vertical edges hinged by corner joints to the transverse walls at lateral and vertical edges thereof adjacent to said vertical edges of the side wall; and
   wherein a back side of the seat has at least one member capable of fittably engaging at least one other member formed on an upper end of each of said side walls of each of said side walls of the enclosing wall assembly, such that when said enclosing wall assembly is opened to the extended state from the folded state and fittably engaged with said seat, said extended state of said enclosing wall assembly is achieved during set-up and maintained during active use without use of any supplemental base support structure.

5. A portable plastics stool as defined in claim 4, wherein the at least one member disposed on the back side of the seat includes structure defining recesses fittable on top edges of said side walls, with the top edges serving as the at least one other member.

6. A portable plastics stool as defined in claim 4 or 5, wherein:

the vertical halves of each of the side walls assume a rectilinear configuration when extended and outer faces of said vertical halves of each of the side walls contact one another when folded; and each of said side walls as a whole lies perpendicular to the transverse walls when extended, and each of said vertical halves of the side walls has an inner face contacting an inner face of one of the transverse walls when folded.

7. A portable plastics stool as defined in claim 4 or 5, wherein:

the vertical halves of each of the side walls assume a rectilinear configuration when extended, and protrude sideways and out of the transverse walls when folded; and each of the side walls as a whole lies perpendicular to the transverse walls when extended, and each of said vertical halves of the side walls has an inner face contacting each other when folded.

* * * * *